(12) United States Patent
Shoji (10) Patent No.: US 10,245,930 B2
(45) Date of Patent: Apr. 2, 2019

(54) DEFLECTOR DEVICE

(71) Applicant: AISIN SEIKI KABUSHIKI KAISHA, Kariya-shi, Aichi-ken (JP)

(72) Inventor: Akitoshi Shoji, Nagoya (JP)

(73) Assignee: Aisin Seiki Kabushiki Kaisha, Kariya-shi, Aichi-ken (JP)

( * ) Notice: Subject to any disclaimer, the term of this patent is extended or adjusted under 35 U.S.C. 154(b) by 0 days.

(21) Appl. No.: 15/975,341

(22) Filed: May 9, 2018

(65) Prior Publication Data

US 2018/0326828 A1 Nov. 15, 2018

(30) Foreign Application Priority Data

May 11, 2017 (JP) ................................. 2017-094811

(51) Int. Cl.
*B60J 7/22* (2006.01)

(52) U.S. Cl.
CPC ...................................... *B60J 7/22* (2013.01)

(58) Field of Classification Search
CPC ........................................................ B60J 7/22
USPC ........................................................ 296/217
See application file for complete search history.

(56) References Cited

U.S. PATENT DOCUMENTS

| 2010/0327624 A1* | 12/2010 | Wetzels | B60J 7/22 296/180.1 |
| 2012/0248828 A1* | 10/2012 | Fukami | B60J 7/22 296/217 |

FOREIGN PATENT DOCUMENTS

| CN | 203528265 U | | 4/2014 |
| DE | 10 2005 033 431 B4 | | 2/2007 |
| DE | 10 2005 042 187 B4 | | 3/2007 |
| DE | 10 2008 034 498 B3 | | 11/2009 |
| DE | 102010048457 | * | 3/2017 |
| JP | 2003-276447 | | 9/2003 |
| JP | 2005-289310 | | 10/2005 |
| JP | 2006-168439 | | 6/2006 |
| JP | 2007-276574 | | 10/2007 |

* cited by examiner

*Primary Examiner* — Dennis H Pedder
(74) *Attorney, Agent, or Firm* — Finnegan, Henderson, Farabow, Garrett & Dunner, LLP (57) ABSTRACT

A deflector device includes: a deflector base fixed to side edge portions of a roof opening portion provided in a roof of a vehicle; a deflector arm assembled to the deflector base to extend along the side edge portions and rotatably supported to approach and separate from the roof opening portion in response to an opening and closing operation of a panel for opening and closing the roof opening portion; a deflector unit configured to be deployed when the deflector arm is separated from the roof opening portion and to be stored when the deflector arm approaches the roof opening portion; and a biasing member installed such that one end side thereof is assembled to the deflector base and the other end side thereof biases the deflector arm in a direction in which the deflector arm is separated from the roof opening portion.

12 Claims, 7 Drawing Sheets

DEFLECTOR DEVICE

CROSS REFERENCE TO RELATED APPLICATIONS

This application is based on and claims priority under 35 U.S.C. § 119 to Japanese Patent Application 2017-094811, filed on May 11, 2017, the entire contents of which are incorporated herein by reference.

TECHNICAL FIELD

This disclosure relates to a deflector device.

BACKGROUND DISCUSSION

In the related art, JP 2006-168439A (Reference 1) discloses a deflector device that suppresses air vibrations caused by entrainment of wind into a passenger compartment when a roof opening portion provided in a roof of a vehicle is opened.

In Reference 1, a deflector device including a deflector arm that rotates so as to approach and separate from a sunshade rail provided along an opening of the roof along with opening and closing operations of a sliding panel that opens and closes the opening of the roof is described. In a case where the sliding panel performs an opening operation, this deflector device is configured so that the deflector arm is released and rotated so as to be separated from the sunshade rail, and a deflector blade is deployed in conjunction with the rotation of the deflector arm. In addition, in a case where the sliding panel performs the closing operation, it is configured so that the deflector arm is pressed down and rotated so as to approach the sunshade rail and the deflector blade is stored in conjunction with the rotation of the deflector arm. In the deflector device of Reference 1, a leaf spring that biases the deflector arm in a direction which is separated from the sunshade rail is provided.

In the deflector device of Reference 1, one end of a leaf spring is fixed to a base member attached to a sunshade rail. In addition, the other end of the leaf spring is fitted from the sunshade rail side to a groove having an opening on the side of the sunshade rail provided along an extending direction of the deflector arm. Accordingly, the leaf spring slides in a state of being in line contact with the bottom of the groove of the deflector arm when the deflector arm rotates. In this case, the leaf spring slides in a state of being in face contact with the side wall of the groove of the deflector arm. As a sliding resistance increases when the deflector arm rotates, there is a concern that the sliding sound based on the sliding becomes larger.

Thus, a need exists for a deflector device which is not susceptible to the drawback mentioned above.

SUMMARY

A deflector device according to an aspect of this disclosure includes: a deflector base which is fixed to both side edge portions of a roof opening portion provided in a roof of a vehicle; a deflector arm which is assembled to the deflector base so as to extend along both side edge portions of the roof opening portion and is rotatably supported so as to approach and separate from the roof opening portion in response to an opening and closing operation of a panel for opening and closing the roof opening portion; a deflector unit which is configured to be deployed in a case where the deflector arm is separated from the roof opening portion and to be stored in a case where the deflector arm approaches the roof opening portion; and a biasing member which is installed in a state of being abutted on the deflector arm so that one end side thereof is assembled to the deflector base and the other end side thereof biases the deflector arm in a direction in which the deflector arm is separated from the roof opening portion, in which the biasing member is a wire material bent in a U shape as a whole so that both tip ends thereof approach each other, and is installed so that both tip ends of the wire material become the one end side and an R-shaped part in which parts respectively extending from both the tip ends join together becomes the other end side.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

One embodiment of the deflector device will be described below. Hereinafter, a front and rear direction of a vehicle is referred to as "front and rear direction", a width direction of a vehicle is referred to as "width direction", and an up and down direction of a vehicle is referred to as "up and down direction".

Figure 1:
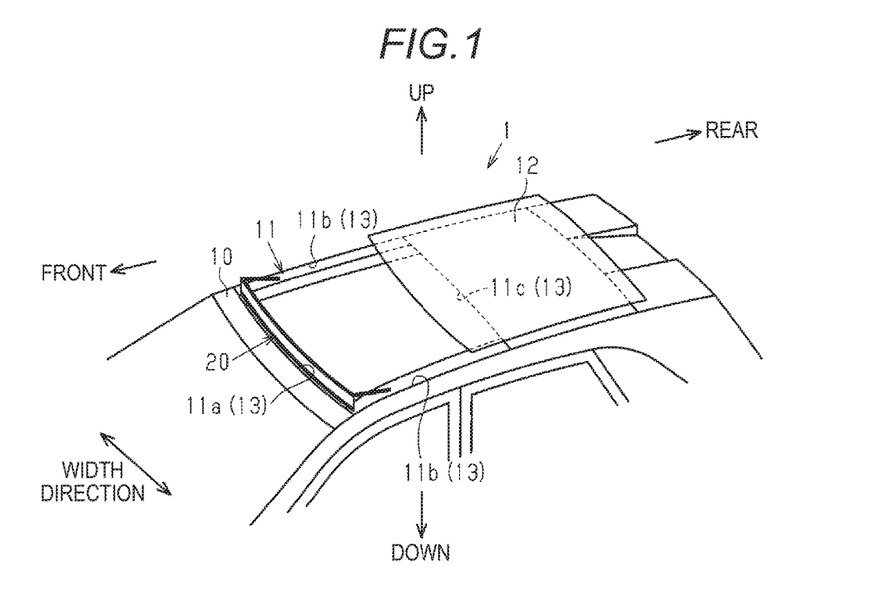
FIG. 1 is a perspective view illustrating a roof to which a deflector device is applied.

As illustrated in FIG. 1, a roof 10 of a vehicle such as an automobile includes a rectangular tubular roof opening portion 11. The roof 10 is provided with a sunroof apparatus 1 including a panel 12 capable of opening and closing the roof opening portion 11. The panel 12 has a rectangular shape having a long side and a short side, and is, for example, a glass plate. The panel 12 opens and closes the roof opening portion 11 by operating (opening and closing operation) in the front and rear direction with respect to the roof opening portion 11. A weather strip 13 is provided on a front edge portion 11a and a rear edge portion 11c which are the peripheral edges of the roof opening portion 11 and face each other in the front and rear direction and both side edge portions 11b facing each other in the width direction. The weather strip 13 has a function of blocking a gap between the roof opening portion 11 and the panel 12 in a state where the roof opening portion 11 is closed by the panel 12.

Figure 2:
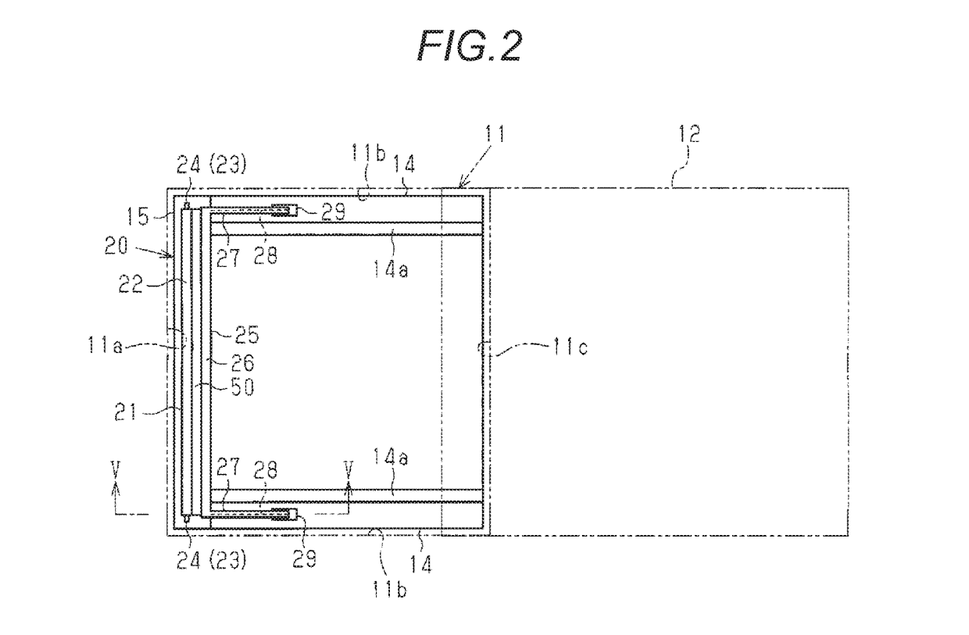
FIG. 2 is a plan view illustrating a schematic configuration of the deflector device.

As illustrated in FIG. 2, in the roof opening portion 11, both side edge portions 11b are provided with guide rails 14 having a pair of rail portions 14a extending in the front and rear direction along both side edge portions 11b. The front edge portion 11a is provided with a front housing 15 extending along the front edge portion 11a and connecting the front ends of the pair of guide rails 14 to each other in the width direction. A driving mechanism (not illustrated) for performing the opening and closing operation of the panel 12 is slidably assembled to the rail portion 14a of each guide rail 14. The pair of guide rails 14 and the front housing 15 are provided with a deflector device 20 so as to overlap in the upward direction thereof.

Figure 3:
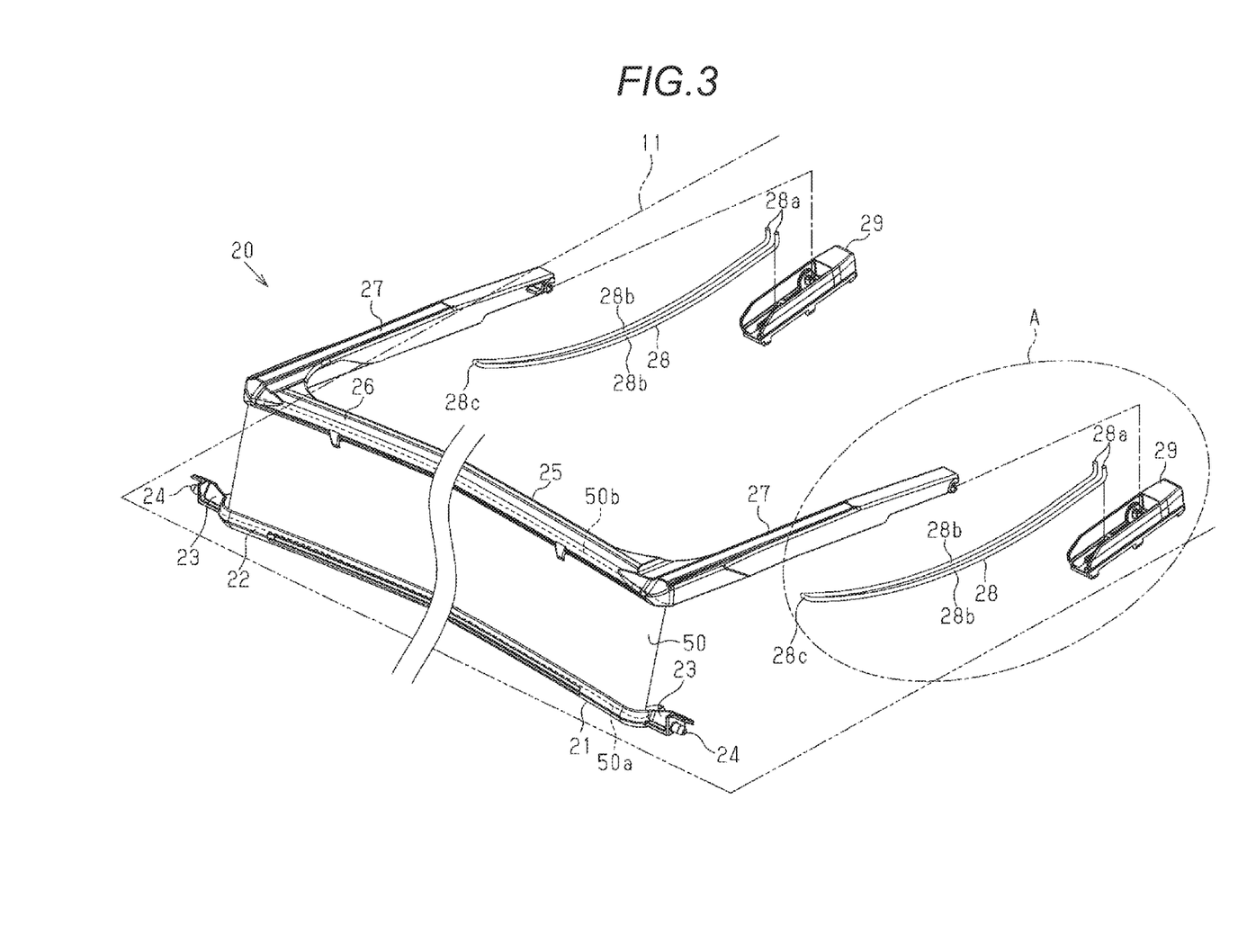
FIG. 3 is an exploded perspective view illustrating the configuration of the deflector device.

Next, the configuration of the deflector device 20 will be described in detail. As illustrated in FIGS. 2 and 3, the deflector device 20 includes the front housing 15, that is, a lower frame 21 provided along the front edge portion 11a of the roof opening portion 11. The lower frame 21 has a rod-like outer shell and is made of a resin material such as polyethylene resin, for example.

The lower frame 21 has a rod-like lower main body 22 extending in the width direction along the front edge portion 11a. At both ends of the lower main body 22, strip-like attaching portions 23 extending rearward from both ends thereof are provided. A boss-shaped holding protrusion 24 protruding outward in the width direction is provided on the tip side of the attaching portion 23. The holding protrusions 24 are inserted through fixing holes (not illustrated) provided in the front housing 15, respectively. Thus, the lower frame 21 is fixed to the front housing 15, that is, the vehicle via holding protrusions 24 provided at both ends of the lower main body 22.

In addition, the deflector device 20 is provided with a deflector frame 25 which can rotate (vertically moving) so as to approach and separate from the roof opening portion 11. The deflector frame 25 has a substantially C-shaped outer shell and is made of, for example, a resin material such as polyethylene resin.

The deflector frame 25 has a rod-like deflector main body 26 extending in the width direction along the front edge portion 11a. The deflector main body 26 faces the lower main body 22 of the lower frame 21 in the up and down direction. At both ends of the deflector main body 26, a pair of deflector arms 27, respectively, extending rearward from both ends along both side edge portions 11b are provided.

In addition, the deflector device 20 includes a pair of biasing members 28 that individually bias the pair of deflector arms 27 so as to bias the deflector frame 25 in a direction separating from the roof opening portion 11. The biasing member 28 is a wire material having a circular sectional surface such as copper, which is bent in a U shape as a whole so that both tip ends 28a approach each other.

The biasing member 28 is in a state of being totally deflected toward the roof opening portion 11 from a central part in the extending direction. An R portion 28c which is an R-shaped part where a pair of extending portions 28b which are parts extending from both tip ends 28a respectively join together is provided on the opposite side of both tip ends 28a of the biasing member 28. Both tip ends 28a of the biasing member 28 are bent like a key so as to extend in a direction opposite to a direction in which the pair of extending portions 28b bends.

In addition, the deflector device 20 includes a pair of deflector bases 29 to which a pair of deflector arms 27 and a pair of biasing members 28 are individually assembled. The deflector base 29 is fixed to the outer side in the width direction of the rail portion 14a on the side of the front housing 15 of the guide rail 14. The deflector base 29 has a rectangular parallelepiped shape having a long side and a short side extending along the guide rail 14, and is made of, for example, a resin material such as polyethylene resin.

Figure 4:
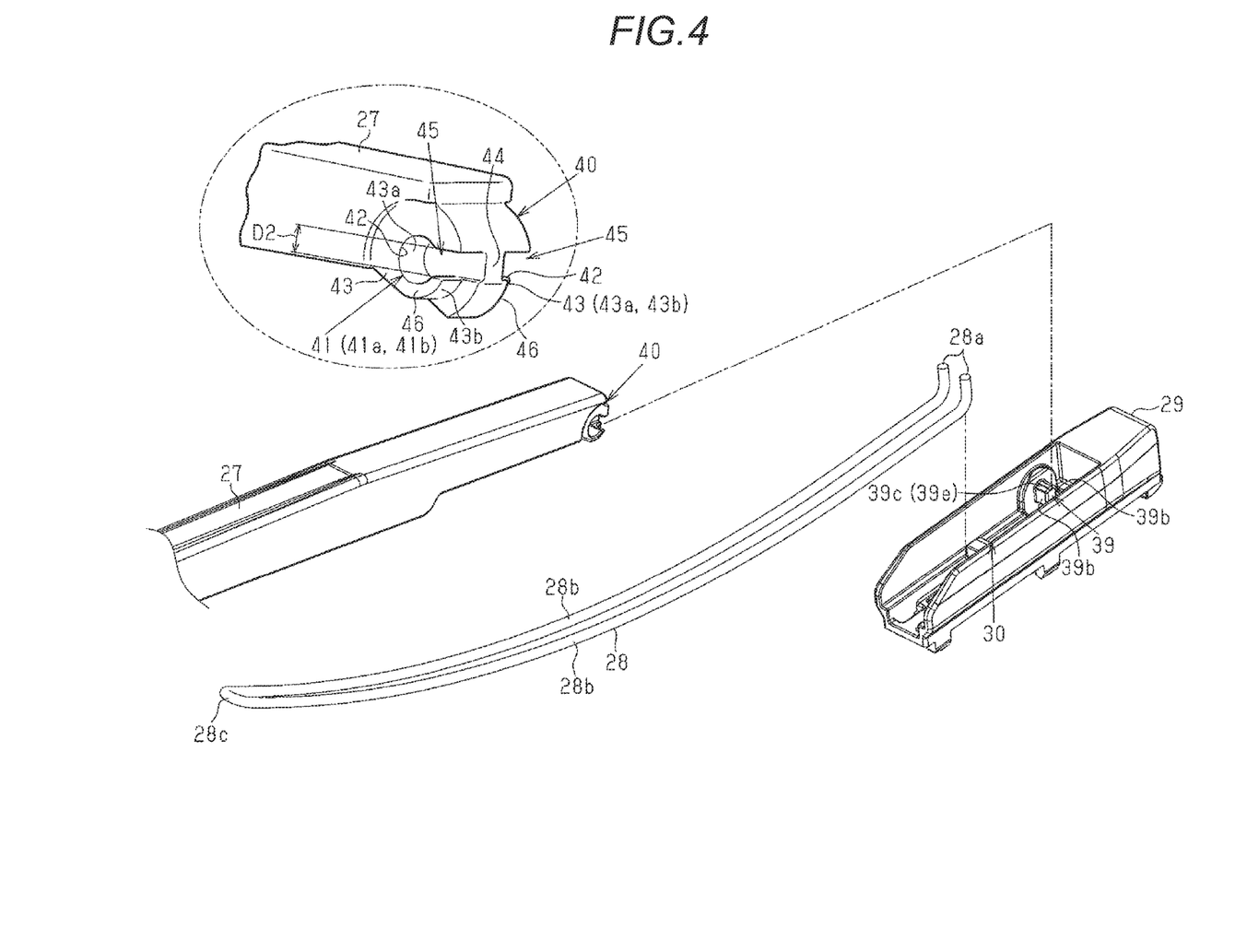
FIG. 4 is an enlarged perspective view of range A in FIG. 3.

As illustrated in FIG. 4, the deflector base 29 is provided with a rectangular parallelepiped storage portion 30 having a long side and a short side which open to the front side which is the front housing 15 side and the upper side which is opposite to the roof opening portion 11 side are provided. A deflector arm 27 and a biasing member 28 are assembled to the storage portion 30, respectively.

Specifically, the deflector arm 27 is assembled to the storage portion 30 so as to extend along both side edge portions 11b of the roof opening portion 11. In the deflector arm 27, a rotation portion 40 provided on the tip side of the deflector arm 27 is rotatably installed with respect to the deflector base 29. Accordingly, the deflector arm 27 is rotatably supported so as to approach and separate with respect to the guide rail 14 provided along both side edge portions 11b, that is, with respect to the roof opening portion 11 about the rotation portion 40.

In addition, a biasing member 28 is assembled in the storage portion 30 so as to be interposed between the deflector base 29 and the deflector arm 27. The biasing member 28 is installed such that both tip ends 28a, which are parts on one end side, are locked with the deflector base 29. In addition, the biasing member 28 is installed such that the R portion 28c, which is a part on the other end side, abuts on the deflector arm 27 from the deflector base 29 side. Accordingly, the biasing member 28 applies a biasing force to the deflector arm 27 so as to bias the deflector arm 27 in a direction away from the roof opening portion 11. The configurations described above applies equally to the deflector arm 27, the biasing member 28, and the deflector base 29 on the other side and the deflector arm 27, the biasing member 28, and the deflector base 29 on the range A side illustrated in FIG. 3.

In addition, as illustrated in FIGS. 2 and 3, the deflector device 20 includes a deflector unit 50 for suppressing air vibrations caused by entrainment of wind into the passenger compartment by being deployed when the roof opening portion 11 is opened. The deflector unit 50 is bridged between the lower frame 21 and the deflector frame 25 so as to connect the lower frame 21 and the deflector frame 25. The deflector unit 50 is in the form of a belt, and is a mesh member woven in a mesh shape with, for example, nylon or the like.

Figure 5:
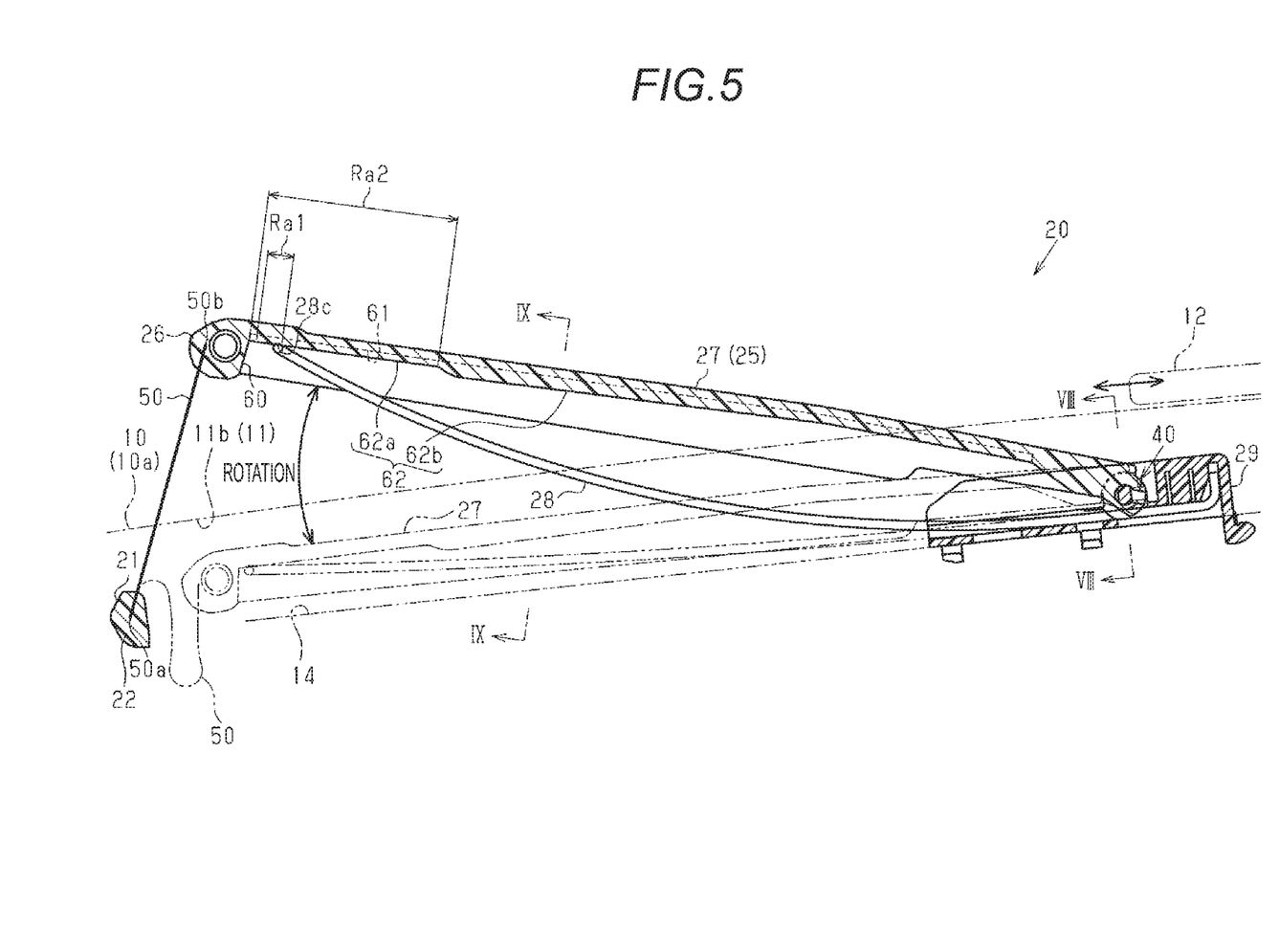
FIG. 5 is an end view illustrating an end surface structure taken along line V-V in FIG. 2.

As illustrated in FIG. 5 illustrating the end surface structure of FIG. 2, on the lower main body 22 of the lower frame 21, a lower side terminal portion 50a which is one side of the deflector unit 50 in the width direction over the entire length in the longitudinal direction is buried. On the deflector main body 26 of the deflector frame 25, an upper side terminal portion 50b which is the other side of the deflector unit 50 in the width direction over the entire length in the longitudinal direction is buried. The terminal portions 50a and 50b of the deflector unit 50 are integrally formed with the lower main body 22 and the deflector main body 26, for example, by insert molding.

As illustrated by the solid line in FIG. 5, when the deflector frame 25 is released from the panel 12 side according to the opening operation of the panel 12, the deflector arm 27 rotates by the biasing force of the biasing member 28 (hereinafter, referred to as "upward movement") so as to be separated from the roof opening portion 11 about the rotation portion 40. In this case, the deflector main body 26 operates so as to be separated in the up and down direction with respect to the lower main body 22. Accordingly, the deflector device 20 operates to expand the deflector unit 50 in the width direction, which is the lateral direction, and to deploy the deflector unit 50 so as to protrude from an upper surface 10a of the roof 10 (deployment operation).

On the other hand, when the deflector frame 25 is pressed down from the panel 12 side according to the closing operation of the panel 12 as illustrated by a two-dot chain line in FIG. 5, the deflector arm 27 rotates against the biasing force of the biasing member 28 (Hereinafter referred to as "downward movement") so as to approach the roof opening portion 11 about the rotation portion 40. In this case, the deflector main body 26 operates so as to approach the lower main body 22 in the up and down direction. Accordingly, the deflector device 20 operates so as to shorten the deflector unit 50 in the width direction and to store the deflector unit 50 so as to be accommodated in the lower side (for example, front housing 15) of the upper surface 10a of the roof 10 (storage operation).

Next, the configuration related to the assembly of the deflector arm 27, the biasing member 28, and the deflector base 29 will be described in detail. First, the configuration of the deflector base 29 will be described.

Figure 6:
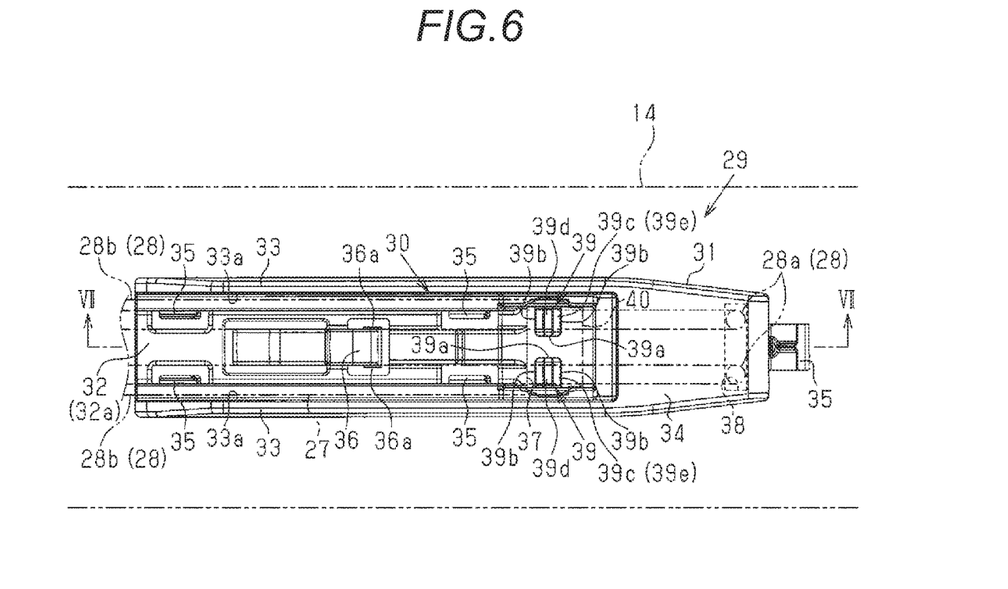
FIG. 6 is a plan view illustrating a deflector base configuration of the deflector device.
Figure 7:
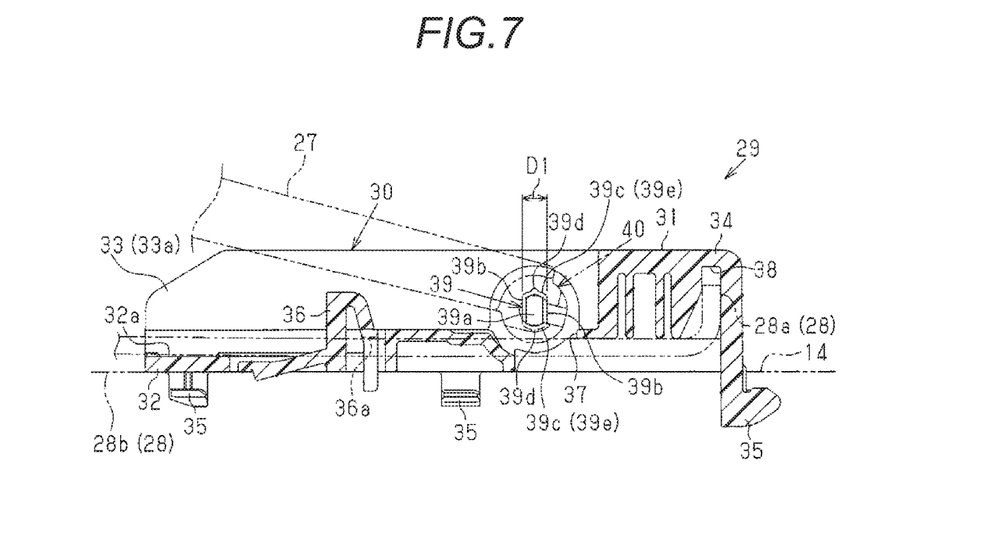
FIG. 7 is a sectional view illustrating a sectional structure taken along line VII-VII of FIG. 6.

As illustrated in FIG. 6 and FIG. 7 illustrating a sectional structure of the FIG. 6, the deflector base 29 includes a box-shaped base main body 31 having a long side and a short side and provided with the storage portion 30. The base main body 31 includes a bottom portion 32 extending along the longitudinal direction of the base main body 31, a pair of side walls 33 erected from the bottom portion 32, and a main body portion 34 connecting side walls 33 to each other at an end portion on one side of the storage portion 30 so as to define the storage portion 30 in the longitudinal direction.

A plurality of (five in the present embodiment) pawl portions 35 which fixes the base main body 31, that is, the deflector base 29 to the guide rail 14 through locking with the guide rail 14 are provided in the bottom portion 32. Each pawl portion 35 protrudes from the side opposite to the side where each side wall 33 erects with respect to the bottom portion 32. In the storage portion 30, the bottom portion 32 is provided with a bottom surface 32a on which a pair of extending portions 28b (indicated by two-dot chain lines in FIGS. 6 and 7) of the biasing member 28 are installed.

On the bottom surface 32a, a first locking portion (hereinafter referred to as "locking piece") 36 for locking the pair of extending portions 28b is provided. The locking pieces 36 extend toward the inside of the storage portion 30 with respect to the bottom surface 32a. In addition, the locking piece 36 is disposed approximately at the center of the range in which the storage portion 30 extends, and substantially at the center between the side walls 33 among the bottom surface 32a. The locking piece 36 is provided with a pair of engagement pawls 36a protruding toward the opposed side walls 33.

In addition, a through-hole 37 penetrating the bottom surface 32a in the thickness direction is provided on the bottom surface 32a. The through-hole 37 is provided adjacent to the main body portion 34. A second locking portion (hereinafter referred to as "locking groove") 38 which locks both tip ends 28a of the biasing member 28 is provided in the main body portion 34. The locking groove 38 opens toward the bottom portion 32 and has a depth in a direction in which each side wall 33 erects. The locking groove 38 is disposed on a side opposite to the storage portion 30 side among the main body portion 34. The locking groove 38 communicates with the storage portion 30 through a through-hole 37 provided in the bottom surface 32a.

As indicated by two-dot chain lines in FIGS. 6 and 7, in the deflector base 29, the biasing member 28 is assembled, in a state where both tip ends 28a are inserted and locked into the locking grooves 38, also extend to the storage portion 30 through the through-holes 37, and the pair of extending portions 28b are hooked and locked by the pair of engagement pawls 36a of the locking piece 36. In other words, in the biasing member 28, both tip ends 28a of the biasing member 28 and a pair of extending portions 28b are individually locked, respectively. In this case, the locking pieces 36 are disposed between the lines of the pair of extending portions 28b.

In the storage portion 30, each side wall 33 is provided with a pair of shaft portions 39 into which the rotation portion 40 of the deflector arm 27 is inserted. The pair of shaft portions 39 extends in a columnar shape from inner wall surfaces 33a of the side walls 33 facing each other toward the facing inner wall surface 33a. Tip ends 39a of the pair of shaft portions 39 face each other in a state where the side walls 33 face each other with a gap therebetween. The shaft portion 39 is disposed on the main body portion 34 side of the inner wall surface 33a.

Regarding the shaft portion 39, the sectional shape in the protruding direction is an oval shape having a pair of linear portions 39b facing each other and a pair of circular arc portions 39c facing each other so as to connect the ends of the linear portions 39b to each other. In the present embodiment, the oval-shaped sectional shape has two symmetrical axes (not illustrated) that are orthogonal to each other. The pair of linear portions 39b extends in a direction in which each side wall 33 erects. In other words, the pair of circular arc portions 39c are opposed to each other in the direction in which each side wall 33 erects. On the surface of the pair of circular arc portions 39c, a projecting portion 39d protruding outward in the radial direction with respect to the position on the diagonal line is provided one by one. The projecting portion 39d is provided so as to extend along a direction in which the shaft portion 39 extends. With respect to the surface of the projecting portion 39d, the sectional shape in the direction in which the shaft portion 39 protrudes has a circular arc with a curvature set to be large as compared with other parts.

As indicated by two-dot chain lines in FIGS. 6 and 7, in the deflector base 29, the rotation portion 40 is inserted into the shaft portion 39 between the facing side walls 33, so that the deflector arm 27 is assembled.

Here, the configuration of the deflector arm 27 will be described. As illustrated in FIG. 4, the rotation portion 40 of the deflector arm 27 is provided with a shaft hole 41 to be inserted into the pair of shaft portions 39. The shaft hole 41 has openings 42 on both sides of the deflector arm 27 in the width direction and has a depth in the width direction. The shaft hole 41 is formed in a tubular shape surrounded by a peripheral wall 43 having an inner peripheral surface 43a slidable with a sliding surface 39e which is the surface of a pair of circular arc portions 39c of the shaft portion 39, and is divided into a pair of shaft holes 41a and 41b in the width direction of the deflector arm 27 by the bottom wall 44 which blocks so as not to pass between the openings 42.

The peripheral wall 43 is provided with an insertion port 45 through which the pair of linear portions 39b of the shaft portion 39 passes when the shaft hole 41 is inserted into the shaft portion 39. The insertion port 45 is provided for each of the pair of shaft holes 41a and 41b. The insertion port 45 penetrates the peripheral wall 43 in the radial direction so as to communicate the inner peripheral surface 43a and the outer peripheral surface 43b of the peripheral wall 43. The insertion port 45 is disposed on the side of the peripheral wall 43 opposite to the side on which the deflector arm 27 extends. An opening length D2 which is the size of the opening through which the pair of linear portions 39b of the shaft portion 39 passes at the insertion port 45 is set to be slightly greater than an inter-surface length D1 (Illustrated in FIG. 7) which is a size between the surfaces of the pair of linear portions 39b of the shaft portion 39.

In the present embodiment, the side of the peripheral wall 43 opposite to the side on which the deflector arm 27 extends is a part that does not slide with the sliding surface 39e of the shaft portion 39 when the deflector arm 27 moves up and down. In other words, each insertion port 45 is provided within a range that does not slide with the sliding surface 39e of the shaft portion 39 when the deflector arm 27 moves up and down. On the other hand, in the area of the peripheral wall 43 other than the insertion port 45, the inner peripheral surface 43a sliding with the sliding surface 39e of the shaft portion 39 is provided. In this case, the inner peripheral surface 43a includes at least a range of sliding with the sliding surface 39e of the shaft portion 39 when the deflector arm 27 moves up and down, and is provided in a range larger than the range disclosed above.

In addition, a thin portion 46 is provided at a part of the outer peripheral surface 43b of the peripheral wall 43 that faces the pair of extending portions 28b of the biasing member 28 so as to avoid contact with the pair of extending portions 28b. The thin portion 46 extends along the outer peripheral surface 43b on the side where the biasing member 28 is assembled from both ends of the peripheral wall 43 of the insertion port 45 in the peripheral direction toward a side where the deflector arm 27 extends. The thin portion 46 is provided in a range larger than the rotation amount when the deflector arm 27 moves up and down.

Figure 8:
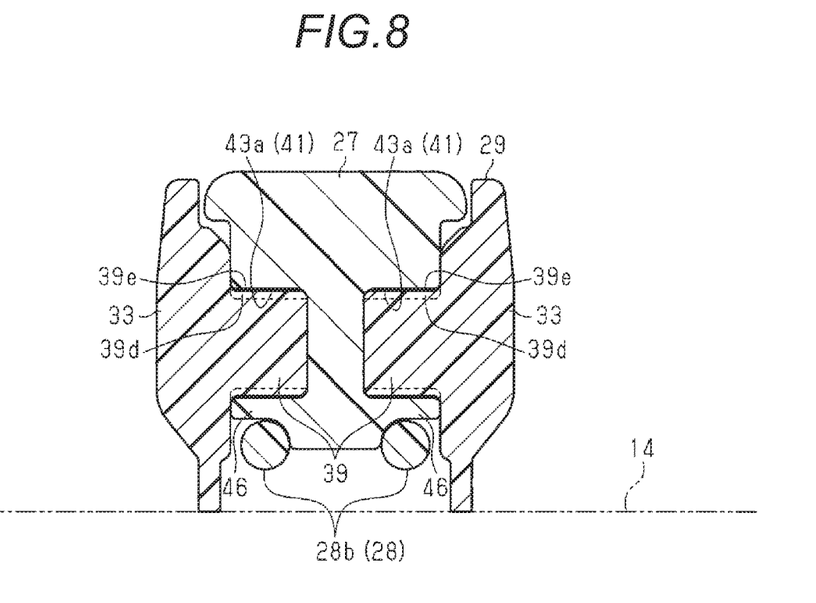
FIG. 8 is an end view illustrating an end surface structure taken along line VIII-VIII of FIG. 5.

As illustrated in FIG. 5 and FIG. 8 illustrating the end surface structure thereof, in a state where the deflector arm 27 is assembled to the deflector base 29, the rotation portion 40 is configured to abut on the sliding surface 39e provided with the projecting portion 39d of the shaft portion 39 via the inner peripheral surface 43a of the shaft hole 41. In this case, the deflector arm 27 is configured to partially wrap a space for assembling with the pair of extending portions 28b of the biasing member 28 in the thin portion 46 of the rotation portion 40.

Figure 9:
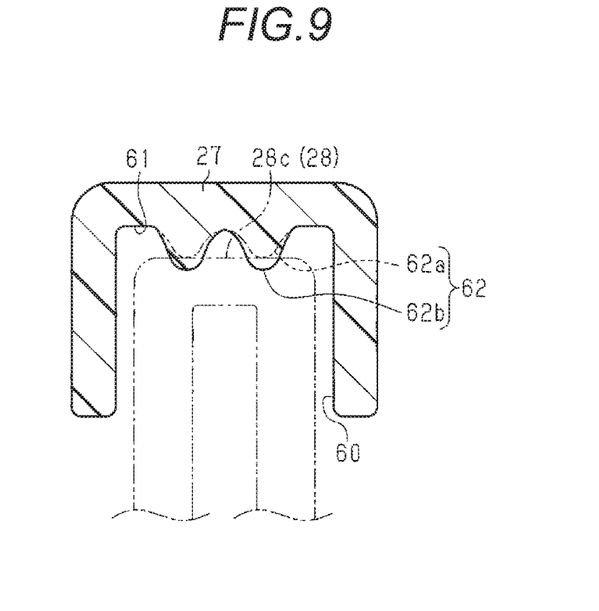
FIG. 9 is an end view illustrating an end surface structure taken along line IX-IX of FIG. 5.

In addition, as illustrated in FIG. 5 and FIG. 9 illustrating the end surface structure thereof, the deflector arm 27 is provided with an installation groove 60 in which the biasing member 28 is installed. The installation groove 60 opens toward the biasing member 28 assembled to the deflector base 29 and has a depth in a direction opposite to the biasing member 28. A groove bottom 61 which is the bottom of the installation groove 60 and is a facing surface facing the biasing member 28 assembled to the deflector base 29 is provided with a pair of abutting portions 62 protruding toward the opening side with respect to the groove bottom 61. The pair of abutting portions 62 are provided so as to extend in parallel to each other along the direction in which the groove bottom 61 extends. The abutting portion 62 has a low portion 62a and a high portion 62b which have different projecting amounts. The projecting amount of the high portion 62b is set to be large as compared with that of the low portion 62a. In the present embodiment, the abutting portion 62 is a reinforcing portion, that is, a so-called rib for increasing the rigidity of the deflector arm 27.

In a state where the deflector arm 27 is assembled to the deflector base 29, the R portion 28c of the biasing member 28 abuts on the low portion 62a of the pair of abutting portions 62 in a state of being point contact with each other in the installation groove 60. In other words, in a case where the deflector device 20 performs the deployment operation or the storage operation, in a state where the R portion 28c of the biasing member 28 comes into point contact with the low portion 62a of the pair of abutting portions 62 in the installation groove 60, the R portions 28c thereof slide between a range Ra1 of the abutting portion 62, respectively. In the present embodiment, the low portion 62a is an abutting part of the abutting portion 62.

In the abutting portion 62, the low portion 62a, which extends along the extending direction of the groove bottom 61, includes the range Ra1 where the R portion 28c of the biasing member 28 slides when the deflector arm 27 moves up and down and is provided in a range Ra2 larger than the range Ra1. On the other hand, in the abutting portion 62, the high portion 62b is provided in a range extending along the extending direction of the groove bottom 61 in a range except for the low portion 62a. In this case, the high portion 62b is provided within a range in which the R portion 28c of the biasing member 28 does not slide when the deflector arm 27 moves up and down. In the present embodiment, the high portion 62b is a non-abutting part of the abutting portion 62.

Hereinafter, a method of assembling the deflector device 20 will be described. This method of assembly includes two major processes, a first process of assembling the biasing member 28 to the deflector base 29 and a second process of assembling the deflector arm 27 to the deflector base 29.

Figure 10A:
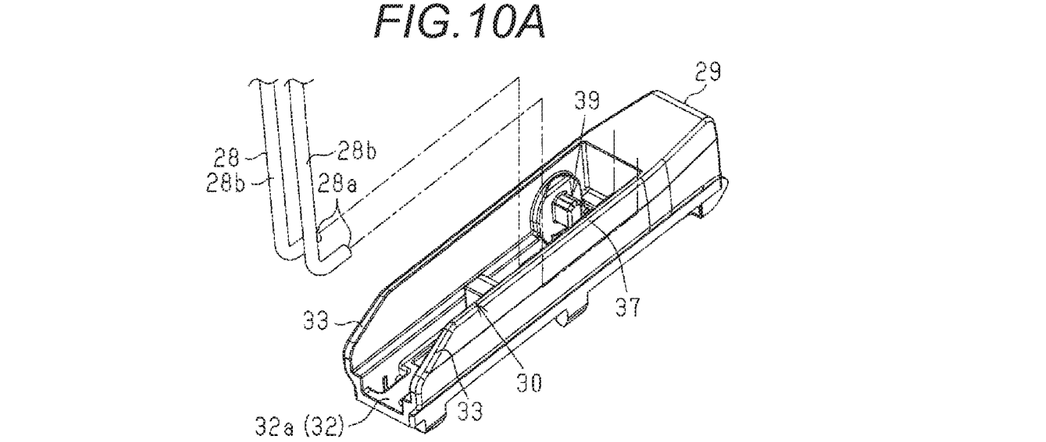
FIGS. 10A to 10C are views for explaining a method of assembling the deflector device.

As illustrated in FIG. 10A, in the first process, the biasing member 28 is inserted into the storage portion 30 of the deflector base 29 from both tip ends 28a. Here, the biasing member 28 may be inserted into the storage portion 30 of the deflector base 29 from the R portion 28c through the through-hole 37.

Figure 10B:
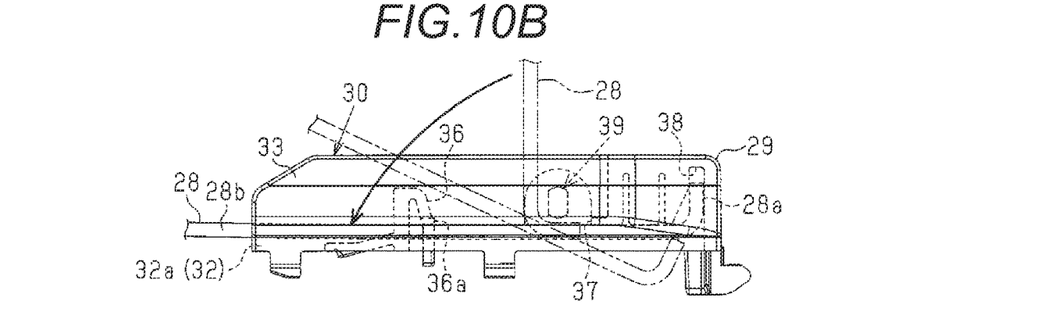

Specifically, as illustrated in FIG. 10B, both tip ends 28a are disposed in the through-hole 37 provided in the bottom surface 32a of the bottom portion 32 in the storage portion 30, and the biasing member 28 is inserted so that the pair of the extending portion 28b is in a state of being extended in a direction in which each side wall 33 erects.

Thereafter, in the first process, the biasing member 28 is rotated so that both tip ends 28a passing through the through-hole 37 are inserted into the locking groove 38 of the main body portion 34 and locked. In this case, in the storage portion 30, the pair of extending portions 28b is in state of interposing the locking pieces 36 between the lines.

In addition, in the first process, the biasing member 28 is further rotated so that the pair of extending portions 28b interposing the locking pieces 36 between the lines are hooked and locked to the pair of engagement pawls 36a of the locking pieces 36. Thereby, the biasing member 28 is fixed to the deflector base 29, and the assembly of the biasing member 28 to the deflector base 29 is completed.

Figure 10C:
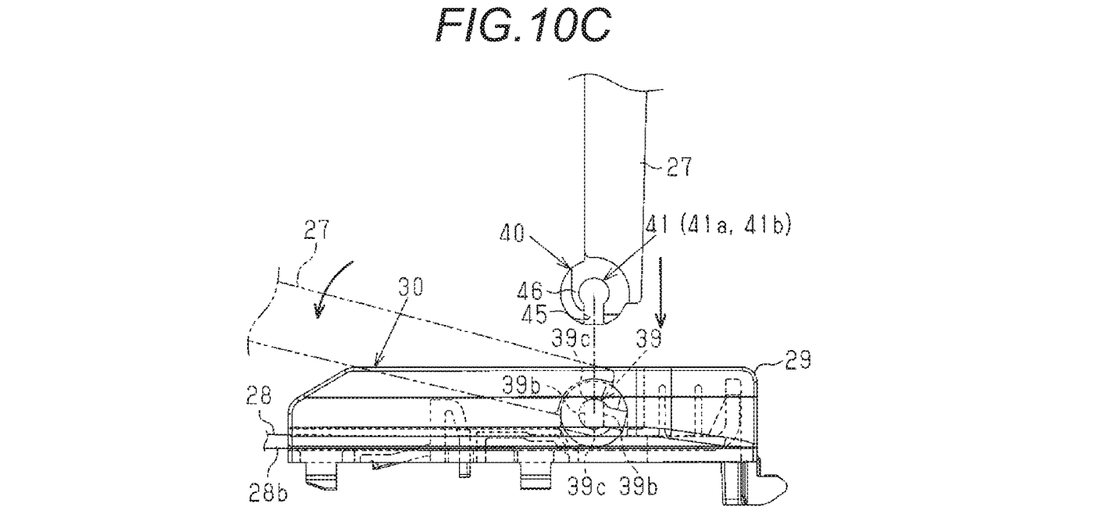

Subsequently, as illustrated in FIG. 10C, in the second process, the deflector arm 27 is inserted from the rotation portion 40 to the storage portion 30 of the deflector base 29. Specifically, in the storage portion 30, the insertion port 45 of the shaft hole 41 (41a and 41b) of the rotation portion 40 is disposed so as to face the shaft portion 39 in the direction in which the pair of linear portions 39b extends and the deflector arm 27 is inserted so that the shaft portion 39 passes through the insertion port 45. In this case, in the rotation portion 40, the shaft hole 41 is inserted into the shaft portion 39 in order from one side of the pair of circular arc portions 39c.

After inserting the shaft hole 41 into the shaft portion 39, in the second process, the deflector arm 27 is rotated (moved down) about the shaft portion 39. Accordingly, in the installation groove 60 of the deflector arm 27, the low portion 62a of the pair of abutting portions 62 abuts on the R portion 28c of the biasing member 28 already assembled, and the assembling of the deflector arm 27 to the deflector base 29 is completed. In addition, assembling of the deflector device 20 is completed via a process of assembling the deflector arm 27 to the deflector main body 26 and a process of fixing the deflector base 29 to the guide rail 14.

Hereinafter, the operation and effects of the present embodiment will be described.

(1) As illustrated in FIG. 5, a part of the biasing member 28 that abuts on the deflector arm 27 is an R portion 28c among the wire material bent in a U shape. In other words, when the deflector arm 27 moves up and down, the biasing member 28 slides on the deflector arm 27 in a point contact state at the R portion 28c. In the present embodiment, since the wire material is employed as the biasing member 28, even when the pair of extending portions 28b comes into contact with the deflector arm 27, the pair of extending portions 28b does not come into surface contact with the deflector arm 27 but comes into line contact with the deflector arm 27. In this case, for example, the sliding area between the biasing member 28 and the deflector arm 27 can be reduced as compared with a case where a leaf spring is used as the biasing member 28. Therefore, sliding resistance can be reduced when the deflector arm 27 moves up and down, and sliding noise based on the rotation of the deflector arm 27 can be reduced.

In addition, in the present embodiment employing a wire material as the biasing member 28, for example, even if there is an exposed part in an installed state of the biasing member 28, a sharp corner or the like is not exposed. In this case, it is effective for improving the safety of the user.

In addition, as illustrated in FIG. 6, in this embodiment employing a wire material as the biasing member 28, a space can be secured between the lines of the pair of extending portions 28b of the biasing member 28. In this space, as the structure for assembling the biasing member 28 to the deflector base 29, the locking pieces 36 are disposed. For example, in a case of employing a leaf spring as the biasing member 28, if a hole is formed in the leaf spring to secure the space, the width so as to secure the strength of the leaf spring must increase, but the increase in the width need not be done in this embodiment. Therefore, in the present embodiment, the deflector base 29 can be miniaturized and the deflector device 20 itself can be miniaturized as compared with a case where a leaf spring is used as the biasing member 28.

(2) As illustrated in FIGS. 5 and 9, the part of the deflector arm 27 that abuts on the R portion 28c of the biasing member 28 is limited on the surfaces of the pair of abutting portions 62 of the deflector arm 27. This makes it possible to suitably maintain the state of reducing the sliding area between the biasing member 28 and the deflector arm 27. Therefore, it is possible to suitably reduce the sliding resistance when the deflector arm 27 rotates.

(3) For example, at the groove bottom 61 of the deflector arm 27, it suffices that at least the abutting portion 62 is provided at a part which abuts on the biasing member 28 when the deflector arm 27 moves up and down, and the effect in (2) can be obtained even if the abutting portion 62 is not provided at a part which does not abut on the biasing member 28.

On the other hand, in the present embodiment, the abutting portion 62 is also provided at the part which does not abut on the biasing member 28 when the deflector arm 27 moves up and down, and with respect to the high portion 62b of the abutting portion 62 corresponding to this, a function as a reinforcing portion, so-called rib is added. Accordingly, the rigidity of the deflector arm 27 can be increased.

(4) As illustrated in FIG. 10C, when the deflector device 20 is assembled, the deflector arm 27 can be assembled to the deflector base 29 by passing the pair of linear portions 39b of the shaft portion 39 through the insertion port 45 of the shaft hole 41. Thus, when the shaft hole 41 is inserted into the shaft portion 39, deformation of the pair of circular arc portions 39c of the shaft portion 39 and the insertion port 45 of the shaft hole 41 can be suppressed. In addition to this, since the insertion port 45 of the shaft hole 41 is provided in a range that does not slide with the sliding surface 39e of the shaft portion 39 when the deflector arm 27 rotates among the inner peripheral surface 43a, even if the deflector arm 27 rotates, falling-off of the deflector arm 27 from the deflector base 29 can be suppressed.

In addition, as illustrated in FIG. 5, in the shaft hole 41 of the present embodiment, by providing the bottom wall 44, the rigidity of the rotation portion 40 increases as compared with a case where the bottom wall 44 is not provided. Thereby, even if the deflector arm 27 repeatedly moves up and down, widening of the insertion port 45 of the shaft hole 41 (distance D2 in the present embodiment), that is, the so-called port opening can be suppressed and a state of suppressing the falling off of the deflector arm 27 from the deflector base 29 can be suitably maintained. Therefore, the durability of the deflector device 20 can be enhanced, and the reliability can be improved.

(5) As illustrated in FIG. 8, in the present embodiment, the assembling space of the rotation portion 40 and the biasing member 28 can be wrapped with each other by the amount corresponding to the provision of the thin portion 46 in the rotation portion 40. Accordingly, the assembling space of the rotation portion 40 and the biasing member 28 can be reduced. In this case, it is effective to miniaturize the deflector base 29 and miniaturize the deflector device 20 itself.

(6) As illustrated in FIG. 8, in a state where the deflector arm 27 is assembled to the deflector base 29, the inner peripheral surface 43a of the rotation portion 40 and the sliding surface 39e of the shaft portion 39 abuts each other via a projecting portion 39d provided on the sliding surface 39e. In other words, the gap based on the manufacturing tolerance and the dimensional tolerance of the member can be eliminated between the inner peripheral surface 43a of the rotation portion 40 and the pair of circular arc portions 39c of the shaft portion 39. Accordingly, when the deflector arm 27 moves up and down, generation of rattling can be suppressed, and smooth movement can be realized.

(7) In the present embodiment, when assembling the deflector device 20, the biasing member 28 may be assembled to the deflector base 29 through the locking piece 36 and the locking groove 38. In this case, since it is possible to lock both tip ends 28a of the biasing member 28 and to separately lock the pair of extending portions 28b, irrespective of the deflector arm 27, the biasing member 28 alone can be fixed to the deflector base 29. As described above, the function of fixing the biasing member 28 alone to the deflector base 29, can be added to the deflector base 29 by the locking piece 36 constituting the deflector base 29 and the locking groove 38. Therefore, there is no need to provide other components for fixing the biasing member 28, and the number of components can be reduced. In other words, the deflector device 20 itself can be miniaturized.

In addition, in a state where the biasing member 28 is assembled to the deflector base 29, the deflector arm 27 can be continuously assembled to the deflector base 29 without concern for positional deviation of the biasing member 28. In this case, it is effective for improving workability in assembling the deflector device 20.

The embodiment described above can also be implemented in the following aspects appropriately changed.

The deflector base 29 may be configured to be capable of fixing the biasing member 28, and the fixing method can be appropriately changed. For example, both tip ends 28*a* of the biasing member 28 may be locked with the same structure as the locking pieces 36. Besides, the pair of engagement pawls 36*a* may be provided so as to protrude toward the inner wall surface 33*a* facing the inner wall surface 33*a* of each side wall 33.

In addition, in a case where the fixing of the biasing members 28 are sufficiently secured by locking both tip ends 28*a*, the locking pieces 36 may not be provided. Non-provision of the locking piece also applies equally to the locking groove 38. In addition, in the embodiment described above, instead of fixing the biasing member 28 to the deflector base 29 alone, the biasing member 28 may be fixed to the deflector base 29 in relation to the deflector arm 27.

In the embodiment described above, the projecting portion 39*d* may be provided so as to protrude radially inward from the inner peripheral surface 43*a* of the shaft hole 41, instead of providing the projecting portion 39*d* on the shaft portion 39. In a case where the manufacturing tolerance and the dimensional tolerance of the member are small, the projecting portion 39*d* may not be provided.

The projecting portion 39*d* may eliminate the gap based on the manufacturing tolerance and dimensional tolerance of the member between the inner peripheral surface 43*a* of the rotation portion 40 and the pair of circular arc portions 39*c* of the shaft portion 39, for example, it may be provided intermittently along the direction in which the shaft portion 39 extends, or may be provided only in a portion of the direction in which the shaft portion 39 extends. In addition, the surface of the projecting portion 39*d* may have a sectional shape of, for example, a cone shape or a protrusion shape.

In a state where the deflector arm 27 is assembled to the deflector base 29, in a configuration in which the assembling space of the rotation portion 40 and the pair of extending portions 28*b* of the biasing member 28 does not overlap each other, the thin portion 46 may not be provided in preference to the reinforcement of the rotation portion 40, that is, the deflector base 29.

In the shaft portion 39, a pair of curved portions may be provided instead of the pair of linear portions 39*b* as a sectional shape. In the curved portion, a small curvature as compared with that of the pair of circular arc portions 39*c* may be set. In this case, in the insertion port 45, it is sufficient if the opening length D2 which is slightly larger than the maximum size between the surfaces of the pair of curved portions of the shaft portion 39 is set.

The shaft portion 39 may have a circular sectional shape. In this case, when the deflector arm 27 is assembled to the deflector base 29, the insertion port 45 may be elastically deformed so that the shaft hole 41 can be inserted into the shaft portion 39.

In the shaft hole 41, the bottom wall 44 may not be provided, and a through-hole may be opened to allow passage between the openings 42. In this case, the shaft portion 39 may be one shaft extending so as to connect between the facing side walls 33.

The shaft hole 41 may be configured to be inserted into the shaft portion 39 from the width direction of the deflector arm 27 without providing the insertion port 45.

In the installation groove 60, the range in which the low portion 62*a* and the high portion 62*b* are provided can be appropriately changed according to the rigidity of the deflector arm 27. For example, the projecting amount of the abutting portion 62 may be the same as a whole. In addition, the abutting portion 62 may be one rib, or three or more ribs extending along the direction in which the groove bottom 61 extends, or a lattice-shaped rib extending also in the width direction of the installation groove 60. In addition, in the installation groove 60, it suffices if at least the abutting portion 62 (low portion 62*a*) is provided in the range Ra1 where the R portion 28*c* of the biasing member 28 slides when the deflector arm 27 moves up and down. In addition, in the installation groove 60, in a case where the rigidity of the deflector arm 27 is sufficiently secured, the abutting portion 62 may not be provided.

The deflector unit 50 may be one that does not have a mesh if it can suppress air vibrations caused by entrainment of wind into the passenger compartment, has a slit instead of a mesh or may be a metal.

The deflector device 20 may be configured not to include the lower frame 21. In this case, the terminal portion 50*a* of the deflector unit 50 may be fixed to the lower side (for example, front housing 15) of the upper surface 10*a* of the roof 10.

The deflector frame 25 may include at least the deflector arm 27 and may not include the deflector main body 26. In this case, the terminal portion 50*b* of the deflector unit 50 may be fixed to the tip ends of the pair of deflector arms 27.

Each of the modification examples may be applied in combination with each other, for example, the configuration that does not include the lower frame 21 and the deflector main body 26, and the configuration of the other modification examples may be applied in combination with each other.

A deflector device according to an aspect of this disclosure includes: a deflector base which is fixed to both side edge portions of a roof opening portion provided in a roof of a vehicle; a deflector arm which is assembled to the deflector base so as to extend along both side edge portions of the roof opening portion and is rotatably supported so as to approach and separate from the roof opening portion in response to an opening and closing operation of a panel for opening and closing the roof opening portion; a deflector unit which is configured to be deployed in a case where the deflector arm is separated from the roof opening portion and to be stored in a case where the deflector arm approaches the roof opening portion; and a biasing member which is installed in a state of being abutted on the deflector arm so that one end side thereof is assembled to the deflector base and the other end side thereof biases the deflector arm in a direction in which the deflector arm is separated from the roof opening portion, in which the biasing member is a wire material bent in a U shape as a whole so that both tip ends thereof approach each other, and is installed so that both tip ends of the wire material become the one end side and an R-shaped part in which parts respectively extending from both the tip ends join together becomes the other end side.

According to the configuration described above, a part of the biasing member that abuts on the deflector arm is an R-shaped part of the wire material bent in a U-shape. In other words, when the deflector arm rotates, the biasing member slides in a state of being in point contact with the deflector arm at the R-shaped part. In the configuration described above, since the wire material is adopted as the biasing member, even in a case where the parts extending from both tip ends, respectively, come into contact with the deflector arm, the portions extending from both tip ends do not come into surface contact with the deflector arm but come into line contact with the deflector arm. In this case, for example, the sliding area between the biasing member and the deflector arm can be reduced as compared with a case where a leaf spring is used as the biasing member. Therefore, sliding resistance can be reduced when the deflector arm rotates, and sliding noise based on the rotation of the deflector arm can be reduced.

In the deflector device according to the aspect of this disclosure, it is preferable that the deflector arm is provided with an abutting portion which protrudes toward a side of the biasing member with respect to a facing surface facing the biasing member, and the other end side of the biasing member abuts on the deflector arm via the abutting portion.

According to the configuration described above, the part of the deflector arm that abuts on the R-shaped part of the biasing member is limited to the abutting portion of the deflector arm, that is, the surface of the corresponding abutting portion. Accordingly, it is possible to suitably maintain a state of reducing the sliding area between the biasing member and the deflector arm. Therefore, it is possible to suitably reduce the sliding resistance when the deflector arm rotates.

In the deflector device according to the aspect of this disclosure, it is preferable that the abutting portion includes an abutting part which abuts on the biasing member while the deflector arm rotates and a non-abutting part that does not abut the biasing member and the non-abutting part is configured so that a projecting amount thereof toward the side of the biasing member is large as compared with that of the abutting portion.

For example, on a facing surface facing the biasing member of the deflector arm, it suffices that at least the abutting portion is provided at a part which abuts on the biasing member when the deflector arm rotates, and the above effect can be obtained even if the abutting portion is not provided at the part which does not abut on the biasing member.

On the other hand, according to the configuration, the abutting portion is provided also at a part that does not abut on the biasing member when the deflector arm rotates, and for the non-abutting part of the abutting portion corresponding thereto, the abutting portion is added as a reinforcing portion, so-called a function as a rib. Accordingly, the rigidity of the deflector arm can increase.

In the deflector device according to the aspect of this disclosure, it is preferable that the deflector base has a pair of side walls facing each other in a direction orthogonal to a direction in which the deflector arm extends, in which a shaft portion which extends forward the facing side wall and of which a sectional shape is an oval shape having a pair of linear portions facing each other and a pair of circular arc portions facing each other so as to respectively connect the ends of the linear portions to each other is provided in each side wall, the deflector arm has a rotation portion disposed between the side walls so as to be inserted into the shaft portion of each side wall, shaft holes having a depth from openings on the sides of the facing side walls in a direction in which the side walls face each other are provided in the rotation portion, and each of the shaft holes has a tubular shape which has an inner peripheral surface slidable with a sliding surface which is a surface of the pair of circular arc portions of the shaft portion, in a range which is larger than the range in which the deflector arm is rotated, and has an insertion port which is provided so as to allow the pair of linear portions of the shaft portion to pass through the inner peripheral surface in a radial direction in a range in which the deflector arm is not slid with the sliding surface when the deflector arm rotates so as to pass through the pair of linear portions of the shaft portion when being inserted into the shaft portion, among the inner peripheral surface and has a bottom wall which is provided so as to block between the openings of sides of the side walls facing each other not to pass therethrough.

According to the configuration, when the deflector device is assembled, the deflector arm may be assembled to the deflector base by passing a pair of linear portions of the shaft portion through the insertion port of the shaft hole. Accordingly, when the shaft hole is inserted into the shaft portion, deformation of the pair of circular arc portions of the shaft portion and the insertion port of the shaft hole can be suppressed. Along with this, since the insertion port of the shaft hole is provided within a range among the inner peripheral surface that does not slide with the sliding surface of the shaft portion when the deflector arm rotates, even if the deflector arm rotates, the falling off of the deflector arm from the deflector base can be suppressed.

In addition, since the shaft hole having the configuration described above is provided with the bottom wall, the rigidity of the rotation portion is enhanced as compared with a case where the bottom wall is not provided. Accordingly, it is preferable that, even if the deflector arm repeatedly rotates, widening of the insertion port of the shaft hole, so-called port opening can be suppressed, and a state of suppressing falling off of the deflector arm from the deflector base can be maintained. Therefore, the durability of the deflector device 20 can be enhanced, and the reliability can be improved.

In the deflector device according to the aspect of this disclosure, it is preferable that the deflector arm is assembled in a state where the shaft portion of each side wall of the deflector base is inserted into the shaft hole of the rotation portion, respectively, so as to interpose the biasing member between the rotation portion and the deflector base, and a part of the rotation portion which faces the biasing member is thin as compared with other parts so as to avoid the biasing member.

According to the configuration described above, the assembling space of the rotation portion and the biasing member can be wrapped with each other by the amount corresponding to the reduced thickness of the rotation portion. Accordingly, the space for assembling the rotation portion and the biasing member can be reduced. In this case, it is effective for miniaturizing the deflector base and thus miniaturizing the deflector device itself.

In the deflector device according to the aspect of this disclosure, it is preferable that the shaft portion of each side wall has a pair of projecting portions protruding outward in the radial direction with respect to a position on the diagonal line of the sliding surface.

According to the above configuration, in a state where the deflector arm is assembled to the deflector base, the inner peripheral surface of the rotation portion and the sliding surface of the shaft portion abuts on each other via the projecting portion provided on the sliding surface. In other words, a gap based on the manufacturing tolerance and the dimensional tolerance of the member can be eliminated between the inner peripheral surface of the rotation portion in the deflector arm and the pair of circular arc portions of the shaft portion of each side wall in the deflector base. Accordingly, when the deflector arm rotates, generation of rattling can be suppressed, and smooth movement can be realized.

In the deflector device according to the aspect of this disclosure, it is preferable that, when the one end side of the biasing member is assembled, the deflector base has a first locking portion and a second locking portion which separately lock both tip ends of the biasing member and parts from different both tip ends, respectively.

According to the configuration, when the deflector device is assembled, the biasing member may be assembled to the deflector base through the first locking portion and the second locking portion. In this case, since not only both tip ends of the biasing member can be locked, but different parts from both tip ends can be individually locked, regardless of the deflector arm, the biasing member can be independently fixed to the deflector base. In this manner, the function of independently fixing the biasing member to the deflector base by itself can be added to the deflector base by the first locking portion and the second locking portion which are the configuration of the deflector base. Therefore, it is unnecessary to provide other components for fixing the biasing member, so that the number of components can be reduced. In other words, the deflector device itself can be miniaturized.

In addition, in a state where the biasing member is assembled to the deflector base, the deflector arm can be continuously assembled to the deflector base without being concerned about positional deviation of the biasing member. In this case, it is effective for improving workability in assembling the deflector device.

According to the aspects of this disclosure, the sliding resistance can be reduced when the deflector arm rotates.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A deflector device comprising:
    a deflector base which is fixed to both side edge portions of a roof opening portion provided in a roof of a vehicle;
    a deflector arm which is assembled to the deflector base so as to extend along both side edge portions of the roof opening portion and is rotatably supported so as to approach and separate from the roof opening portion in response to an opening and closing operation of a panel for opening and closing the roof opening portion;
    a deflector unit which is configured to be deployed in a case where the deflector arm is separated from the roof opening portion and to be stored in a case where the deflector arm approaches the roof opening portion; and
    a biasing member which is installed in a state of being abutted on the deflector arm so that one end side thereof is assembled to the deflector base and the other end side thereof biases the deflector arm in a direction in which the deflector arm is separated from the roof opening portion,
    wherein the biasing member is a wire material bent in a U shape as a whole so that both tip ends thereof approach each other, and is installed so that both tip ends of the wire material become the one end side, and a bent part of the wire material becomes the other end side,
    the deflector base has a pair of side walls facing each other in a direction orthogonal to a direction in which the deflector arm extends,
    a shaft portion which extends forward the facing side wall and of which a sectional shape is an oval shape having a pair of linear portions facing each other and a pair of circular arc portions facing each other so as to respectively connect the ends of the linear portions to each other is provided in each side wall,
    the deflector arm has a rotation portion disposed between the side walls so as to be inserted into the shaft portion of each side wall,
    shaft holes each having a depth from openings on sides of the facing side walls in a direction in which the side walls face each other are provided in the rotation portion, and
    each of the shaft holes has a tubular shape which has an inner peripheral surface slidable with a sliding surface which is a surface of the pair of circular arc portions of the shaft portion, and has an insertion port which is provided so as to allow the pair of linear portions of the shaft portion to pass through the inner peripheral surface in a radial direction such that the deflector arm is not slid with the sliding surface when the deflector arm rotates so as to pass through the pair of linear portions of the shaft portion when being inserted into the shaft portion, among the inner peripheral surface and has a bottom wall which is provided so as to block between the openings of sides of the side walls facing each other not to pass therethrough.

2. The deflector device according to claim 1,
    wherein the deflector arm is provided with an abutting portion which protrudes toward a side of the biasing member with respect to a facing surface facing the biasing member, and
    the other end side of the biasing member abuts on the deflector arm via the abutting portion.

3. The deflector device according to claim 2,
    wherein the abutting portion includes an abutting part which abuts on the biasing member while the deflector arm rotates and a non-abutting part that does not abut the biasing member, and
    the non-abutting part is configured so that a projecting amount thereof toward the side of the biasing member is large as compared with that of the abutting portion.

4. The deflector device according to claim 1,
    wherein the deflector arm is assembled in a state where the shaft portion of each side wall of the deflector base is inserted into the shaft hole of the rotation portion, respectively, so as to interpose the biasing member between the rotation portion and the deflector base, and
    a part of the rotation portion which faces the biasing member is thin as compared with other parts so as to avoid the biasing member.

5. The deflector device according to claim 1, wherein the shaft portion of each side wall has a pair of projecting portions protruding outward in the radial direction with respect to a position on a diagonal line of the sliding surface.

6. The deflector device according to claim 4, wherein the shaft portion of each side wall has a pair of projecting portions protruding outward in the radial direction with respect to a position on a diagonal line of the sliding surface.

7. The deflector device according to claim 1, wherein when the one end side of the biasing member is assembled, the deflector base has a first locking portion and a second locking portion which separately lock both tip ends of the biasing member and parts extending from the tip ends, respectively.

8. The deflector device according to claim 2, wherein when the one end side of the biasing member is assembled, the deflector base has a first locking portion and a second locking portion which separately lock both tip ends of the biasing member and parts extending from the tip ends, respectively.

9. The deflector device according to claim 3, wherein when the one end side of the biasing member is assembled, the deflector base has a first locking portion and a second locking portion which separately lock both tip ends of the biasing member and parts extending from the tip ends, respectively.

10. The deflector device according to claim 4, wherein when the one end side of the biasing member is assembled, the deflector base has a first locking portion and a second locking portion which separately lock both tip ends of the biasing member and parts extending from the tip ends, respectively.

11. The deflector device according to claim 5, wherein when the one end side of the biasing member is assembled, the deflector base has a first locking portion and a second locking portion which separately lock both tip ends of the biasing member and parts extending from the tip ends, respectively.

12. The deflector device according to claim 6, wherein when the one end side of the biasing member is assembled, the deflector base has a first locking portion and a second locking portion which separately lock both tip ends of the biasing member and parts extending from the tip ends, respectively.

* * * * *